(12) United States Patent
Epshetsky et al.

(10) Patent No.: US 9,132,539 B1
(45) Date of Patent: Sep. 15, 2015

(54) METHOD OF FORMING A V-RING SEAL

(71) Applicant: AKTIEBOLGET SKF, Gotebord (SE)

(72) Inventors: Yefim Epshetsky, Schaumburg, IL (US); Gregory G. Gildea, Village of Lakewood, IL (US); Maria Concepcion Martin, Madrid (ES)

(73) Assignee: AKTIEBOLAGET SKF, Gotebord (SE)

( * ) Notice: Subject to any disclaimer, the term of this patent is extended or adjusted under 35 U.S.C. 154(b) by 0 days.

(21) Appl. No.: 14/298,205

(22) Filed: Jun. 6, 2014

(51) Int. Cl.
*F16L 13/02* (2006.01)
*B25B 27/00* (2006.01)
*F03D 11/00* (2006.01)
*F16J 15/32* (2006.01)
*B29D 99/00* (2010.01)

(52) U.S. Cl.
CPC ........ *B25B 27/0028* (2013.01); *F03D 11/0008* (2013.01); *F16J 15/322* (2013.01); *F16J 15/3208* (2013.01); *B29D 99/0085* (2013.01); *F05B 2240/57* (2013.01); *F16J 15/3212* (2013.01); *Y10T 29/49703* (2015.01)

(58) Field of Classification Search
CPC ........... B29D 99/0082; B29D 99/0053; Y02E 10/722; F03D 11/0008; F05B 2240/57; F05B 2240/571; F05B 2240/572; F16J 15/322; F16J 15/32; F16J 15/3208; F16J 15/3212; F16J 15/34; F16J 15/3436; F16J 15/3452; F16J 15/344; Y10T 29/49696; Y10T 29/49703
USPC ......................... 277/366, 377, 379, 382, 386; 29/525.05, 525.01
See application file for complete search history.

(56) References Cited

U.S. PATENT DOCUMENTS

| | | | | |
|---|---|---|---|---|
| 3,994,767 A * | 11/1976 | Smith | ............................ | 156/404 |
| 4,755,244 A * | 7/1988 | Allison | ......................... | 156/158 |
| 5,306,022 A * | 4/1994 | Bourque | ........................ | 277/543 |
| 6,149,244 A * | 11/2000 | Wagner | ....................... | 301/105.1 |
| 7,900,357 B2 * | 3/2011 | Hopper | ....................... | 29/898.07 |
| 8,075,196 B2 * | 12/2011 | Burner et al. | .................. | 384/558 |
| 2004/0251634 A1 * | 12/2004 | Shimazu et al. | ............... | 277/434 |
| 2010/0116422 A1 * | 5/2010 | Vaideeswaran et al. | ...... | 156/217 |
| 2013/0087976 A1 * | 4/2013 | Epshetsky et al. | ............ | 277/311 |

* cited by examiner

*Primary Examiner* — Jason L Vaughan
(74) *Attorney, Agent, or Firm* — Mark Ussai; SKF USA Inc. Patent Dept.

(57) ABSTRACT

A method of forming a seal assembly for sealing a space between a first member having a central axis and an outer surface and a second member having a radially-extending axial surface includes the following steps: providing an elongated elastomeric body and a biasing member, the elongated body having opposing ends and a generally V-shaped groove generally along a length of the body between the two ends; bending the elongated body circumferentially about the first member outer surface; coupling the ends of the elongated body to form an annular seal body; and positioning the biasing member within the groove such that the biasing member exerts a radially-inwardly directed force on the annular seal body so as to substantially prevent relative angular displacement between the seal body and the first member.

19 Claims, 6 Drawing Sheets

_US 9,132,539 B1_

METHOD OF FORMING A V-RING SEAL

BACKGROUND OF THE INVENTION

The present invention relates to seals, and more particularly to V-ring seals for sealing against axial surfaces.

V-ring seals are known and typically include an annular elastomeric body having a main body portion and a cantilever-like sealing portion extending from the main body portion. The seal body is disposed on a shaft or other mechanical member and the sealing portion engages with an axial surface of another mechanical member so as to seal an axial space between the shaft/member and the other member. The seal body has a central bore that receives a portion of the shaft/member, which is sized such that there is an interference fit between the body and the shaft/member. This interference fit is important in order to prevent relative angular displacement between the seal body and the shaft/member as either the shaft/member, or the other member which the sealing portion engages, typically rotates about a central axis.

To ensure a proper interference fit, the seal body may be formed as a molded annular body having an appropriately sized central bore. However, in applications where the seal body must be installed about an assembly that does not allow insertion of the shaft/member into the bore, the body is typically formed as an elongated flexible body having ends coupled together to form the annular seal body. In such cases, the desired interference fit is established by cutting the elongated body to a length that is substantially lesser than the circumference about which the seal is installed, and then the body is stretched to a significant extent prior to connecting the body ends. Such an installation process requires special tooling and training to properly install the seal and connect the body ends, and often leads to distortion of the formed seal body.

SUMMARY OF THE INVENTION

In one aspect, the present invention is a method of forming a seal assembly for sealing a space between first and second members, the first member having a central axis and an outer surface, and the second member having a radially-extending axial surface. The method comprises the steps of: providing an elongated elastomeric body and a biasing member, the elongated body having opposing ends and a generally V-shaped groove generally along a length of the body between the two ends; bending the elongated body circumferentially about the first member outer surface; coupling the ends of the elongated body to form an annular seal body; and positioning the biasing member within the groove such that the biasing member exerts a radially-inwardly directed force on the annular seal body so as to substantially prevent relative angular displacement between the seal body and the first member.

In another aspect, the present invention is again a method of forming a seal assembly for sealing a space between first and second members, the first member having a central axis and an outer surface, and the second member having a radially-extending axial surface. The method comprises the steps of: providing an elongated elastomeric body having opposing ends and a base portion and a sealing portion each extending between the ends, the sealing portion having an inner end integrally formed with the base portion and an outer, free end, a generally annular cavity being defined between the base portion and the sealing portion on one side of the body and the body having a generally continuous surface extending between the ends on an opposing side of the body; providing a biasing member; positioning the elongated body against the shaft such that a portion of the continuous surface contacts the shaft and the groove faces generally away from the first member outer surface; bending the elongated body circumferentially about the first member outer surface; coupling the ends of the elongated body to form a generally annular seal body; and positioning the biasing member within the groove such that the biasing member exerts a radially-inwardly directed force on the annular seal body so as to substantially prevent relative angular displacement between the seal body and the first member.

In a further aspect, the present invention is yet again a method of forming a seal assembly for sealing a space between first and second members, the first member having a central axis and an outer surface, and the second member having a radially-extending axial surface. The method comprises the steps of: determining the circumference of the first member outer surface; providing an elongated elastomeric body and a biasing member, the elongated body having opposing ends and a generally V-shaped groove generally along a length of the body between the two ends; sizing the elongated body such that the length of the body is about equal to the circumference of the first member; bending the elongated body circumferentially about the first member outer surface; coupling the ends of the elongated body to form an annular seal body; and positioning the biasing member within the groove such that the biasing member exerts a radially-inwardly directed force on the annular seal body so as to substantially prevent relative angular displacement between the seal body and the first member.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
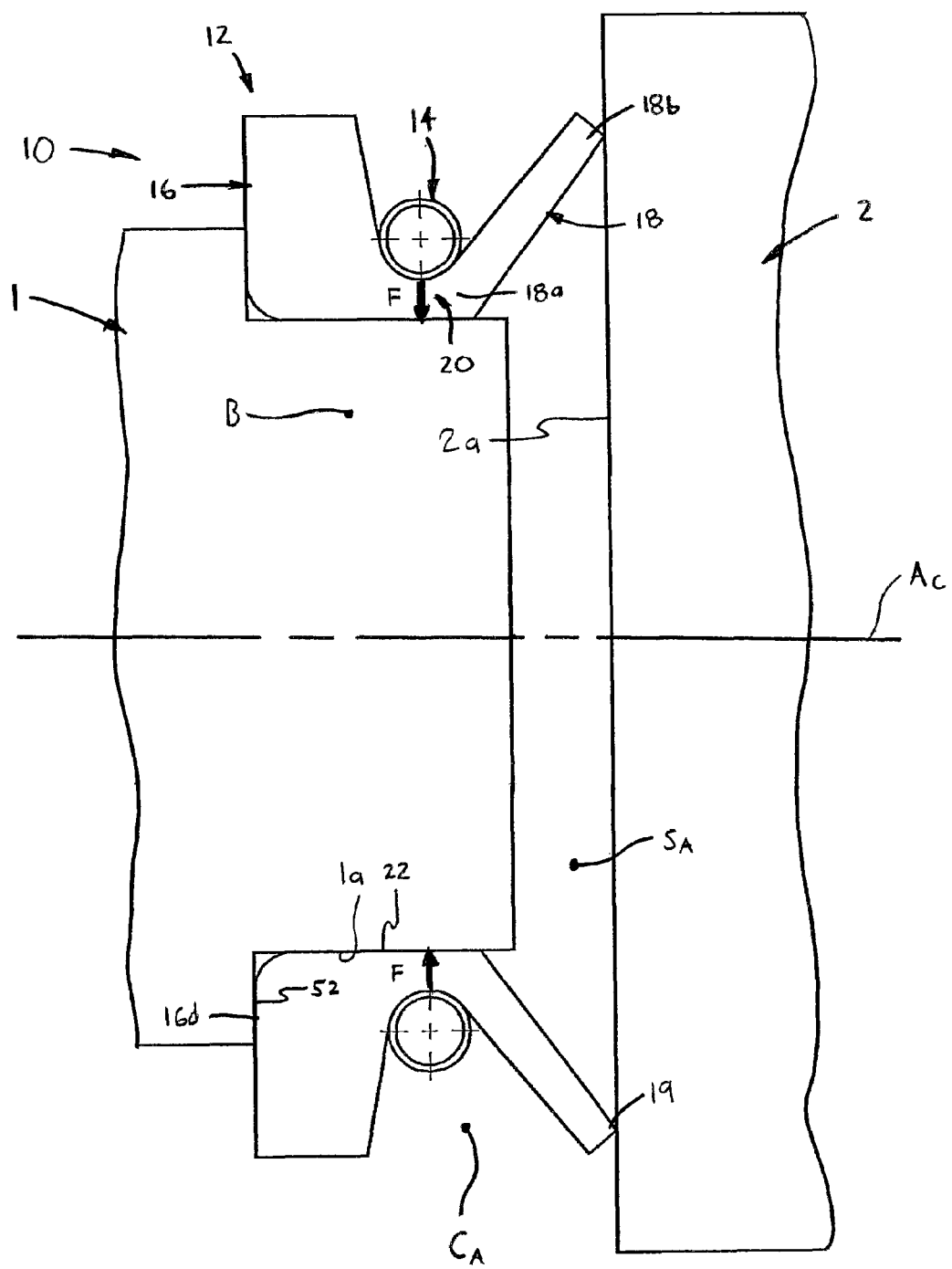
FIG. 1 is an axial cross-sectional view of a machine assembly having a seal assembly in accordance with the present invention.

Certain terminology is used in the following description for convenience only and is not limiting. The words "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-10 a seal assembly 10 for sealing a space $S_A$, which is typically axial, between first and second members 1, 2, respectively. The first member 1 has a central axis $A_C$ and an outer circumferential surface 1a extending about the axis $A_C$, and the second member 2 has a radially-extending axial surface 2a generally adjacent to the outer surface 1a. The seal 10 basically comprises a generally annular elastomeric seal body 12 and a biasing member 14. The annular elastomeric seal body 12 has a central bore B (FIG. 10), is disposed about the first member outer surface 1a and extends circumferentially about the central axis $A_C$; in other words, a portion of the first member 1 is disposed within the seal body central bore B.

The body 12 includes a base portion 16 and a sealing portion 18 having an inner end 18a integrally formed with the base portion 16 and an outer, free end 18b with an axial lip 19 sealingly engaged or engageable with the second member axial surface 2a. A generally annular cavity $C_A$ is defined between the base portion 16 and the sealing portion 18 and the body 12 preferably further includes an integral hinge portion 20 connecting the sealing portion 18 with the base portion 16. As such, the sealing portion 18 is deflectable about the hinge portion 20 in generally axial directions with respect to the base portion 16, as indicated by arrow D in FIG. 2.

Further, the biasing member 14 is disposed within the annular cavity $C_A$ and is configured to exert a generally radially inwardly directed force F on the seal body 12 so as to substantially prevent relative angular displacement between the seal body 12 and the first member 1. In other words, the pressure or force F exerted by the biasing member 14 on the seal body 12 couples the body 12 with the first member 1; i.e., by friction between the seal body 12 and the member 1. As such, whether the first member 1 rotates with respect to the second member 2 or the second member 2 rotates with respect to a fixed first member 1, the seal body 12 remains fixed relative to the first member 1 and the sealing portion 18 remains sealingly engaged with the second member axial surface 2a. Furthermore, the seal body 12 has an inner circumferential surface 22 sealingly engaged with the outer surface 1a, so as to prevent fluid flow, or movement of solid particles, between the seal assembly 10 and the first member 1. As such, the biasing force F exerted on the seal body 12 also functions to provide sealing pressure at the interface between the seal body inner surface 22 and the first member outer surface 1a.

Figure 4:
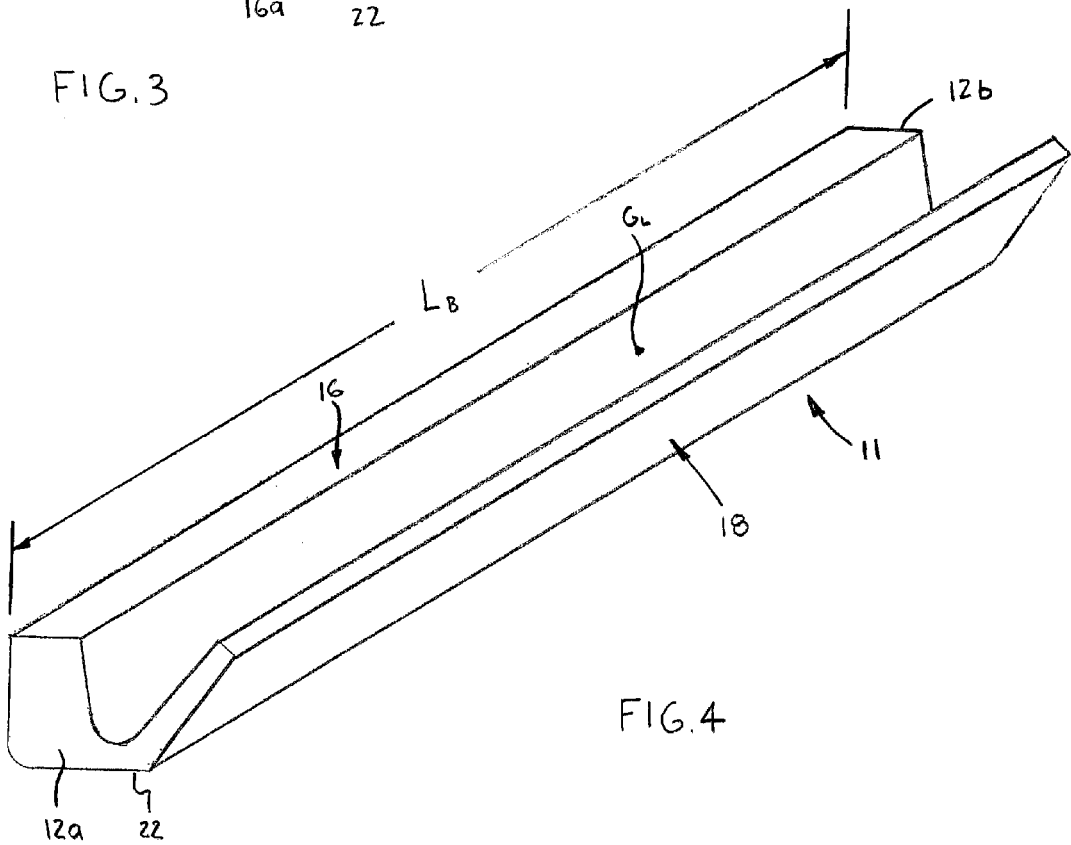
FIG. 4 is a perspective view of a flexible elongated body preferably used to form the annular seal body.
Figure 8:
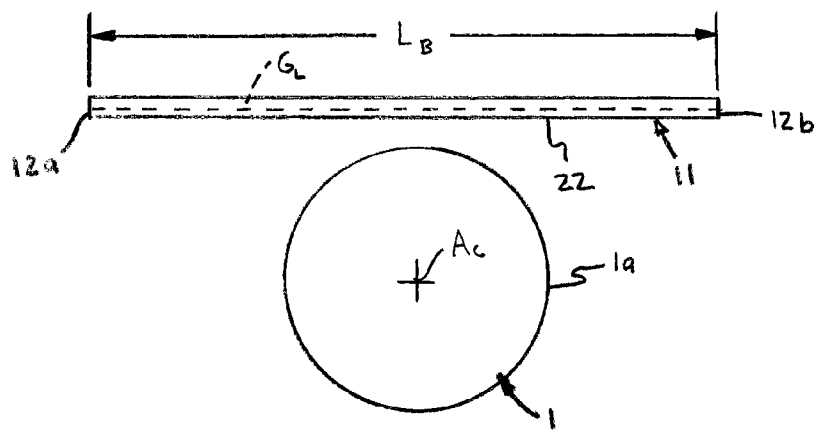
FIG. 8 is a more diagrammatic view of a first member and a flexible elongated body, showing the seal body in an unbended state.
Figure 10:
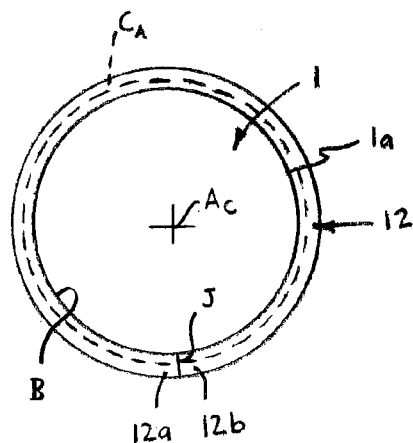
FIG. 10 is yet another more view of the first member and the seal body, showing the seal body completely bended about the first member with ends coupled together to form the annular seal body.

As best shown in FIG. 10, the seal body 12 preferably has two opposing ends 12a, 12b coupled together to form the annular body 12. Specifically, the seal body 12 is preferably formed as a flexible elongated body 11, most preferably an elastomeric extrusion, prior to the coupling of the two ends 12a, 12b, as depicted in FIGS. 4 and 8. The elongated seal body 11 has a linear distance or length $L_B$ between the two ends 12a, 12b when the ends 12a, 12b are uncoupled and the body 11 is in a generally "straightened" state, as indicated in FIGS. 4 and 8. The annular seal body 12 is preferably formed with minimal or no extension of the elongated body 11, such that when the two ends 12a, 12b are coupled together, the circumference of the annular body 12 has a value approximately equal to the value of the linear distance or length $L_B$. Preferably, the amount of extension or "stretching" of the body 11 is minimized such that the increase in the circumference value is within about zero percent (0%) of the linear distance value and about three percent (3%) of the linear distance value.

Figure 2:
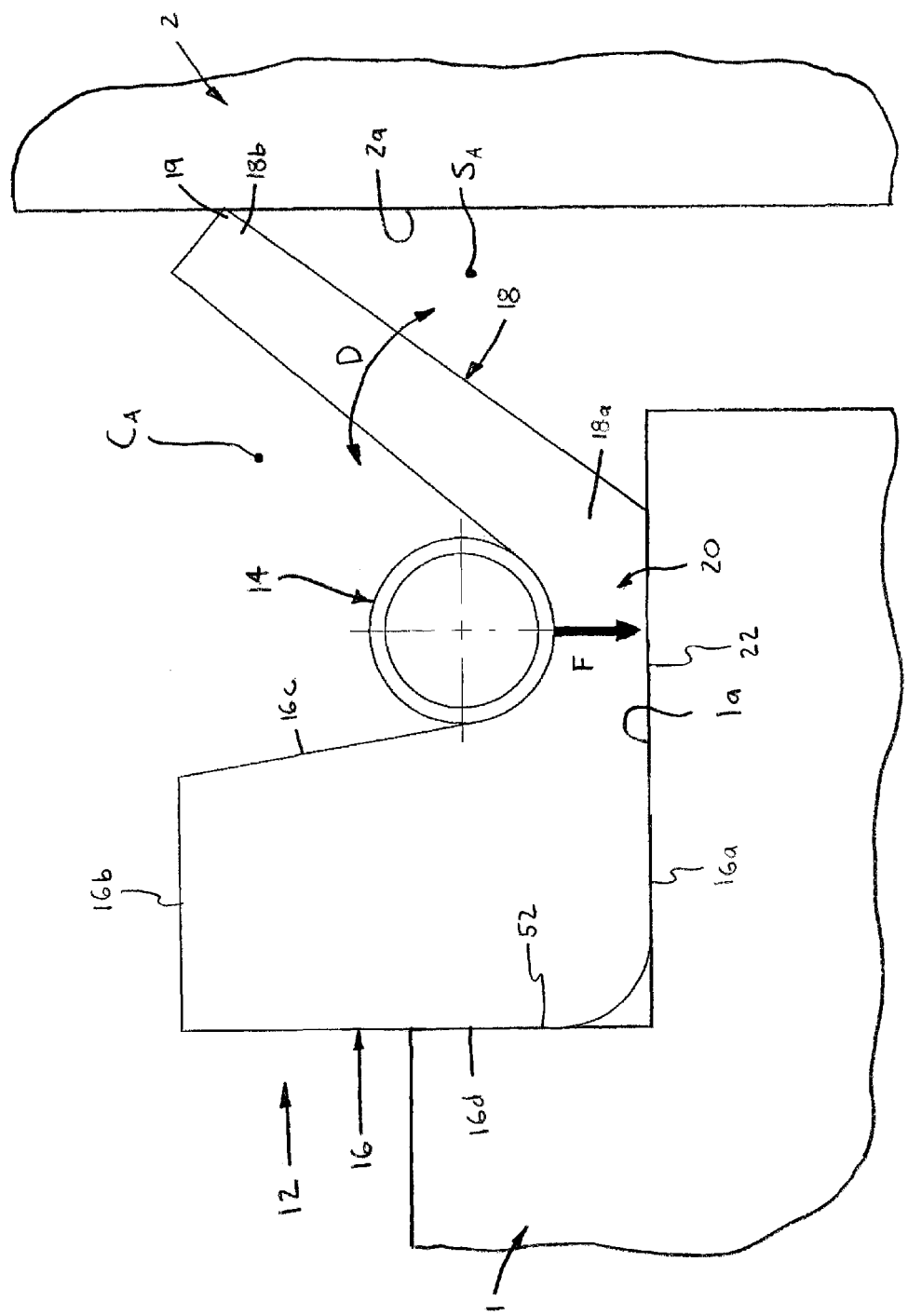
FIG. 2 is a broken-away, enlarged view of an upper portion of FIG. 1.
Figure 5:
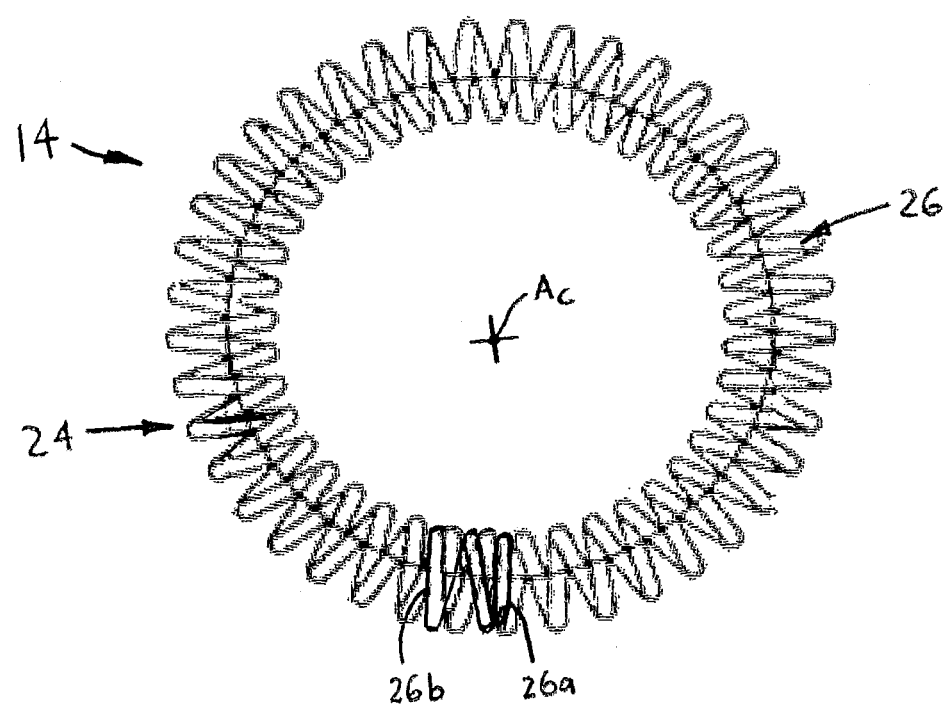
FIG. 5 is a front plan view of a preferred construction of a biasing member, formed generally as a garter spring.

Referring now to FIGS. 1, 2 and 5, the biasing member 14 is generally annular and extends circumferentially about the central axis $A_C$, such that the force F applied to the seal body 12 is distributed substantially uniformly about the circumference of the body 12. Preferably, the biasing member 14 is a garter spring 24, which is most preferably formed of a coil spring 26 having a tapered end 26a and an opposing, standard or "untapered" end 26b. With such a biasing member 14, the straight or "unbended" coil spring 26 is preferably first positioned within the annular cavity $C_A$ of the seal body 12 and then bended circumferentially about the central axis $A_C$ and stretched until the spring ends 26a, 26b are generally in contact. Next, the tapered end 26a is then threaded into the untapered end 26b until the two ends 26a, 26b remain connected together. Although the garter spring biasing member construction is presently preferred, the biasing member 14 may be formed in any other appropriate manner capable of functioning as generally described herein.

Figure 3:
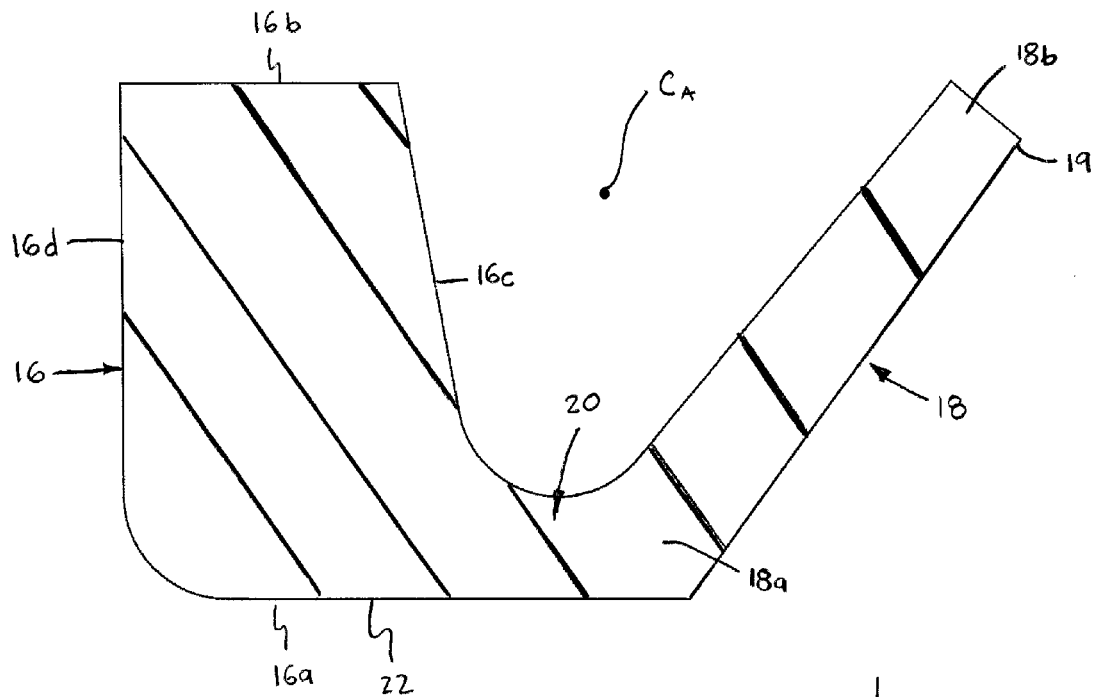
FIG. 3 is an axial cross-sectional view of an annular seal body.

Referring to FIGS. 1-4, the annular elastomeric seal body 12 is preferably formed as a conventional "V-ring" seal. As such, the elastomeric body 12 has generally V-shaped axial cross-sections, i.e., cross-sections taken along the axis $A_C$, as best shown in FIG. 3. More specifically, the base portion 16 has a generally rectangular cross-sectional shape and the sealing portion 18 is preferably generally cantilever-like in cross-section, with the joint portion 20 extending generally axially between the two sections 16, 18. Further, the body base portion 16 has inner and outer circumferential surfaces 16a, 16b and opposing inner and outer axial ends 16c, 16d. With this structure, the inner end 18a of the body sealing portion 18 is integrally formed with the base inner axial end 16c at a position generally proximal to the base inner surface 16a, most preferably being coupled by the integral joint section 20. As such, the sealing portion 18 extends from the sealing portion inner end 18a to the sealing portion outer, free end 18b both generally radially outwardly from, and generally axially away from, the body base portion 16. However, the seal body 12 may have any appropriate shape that includes a generally cantilever-like section for sealing axially against a radially-extending surface.

Figure 6:
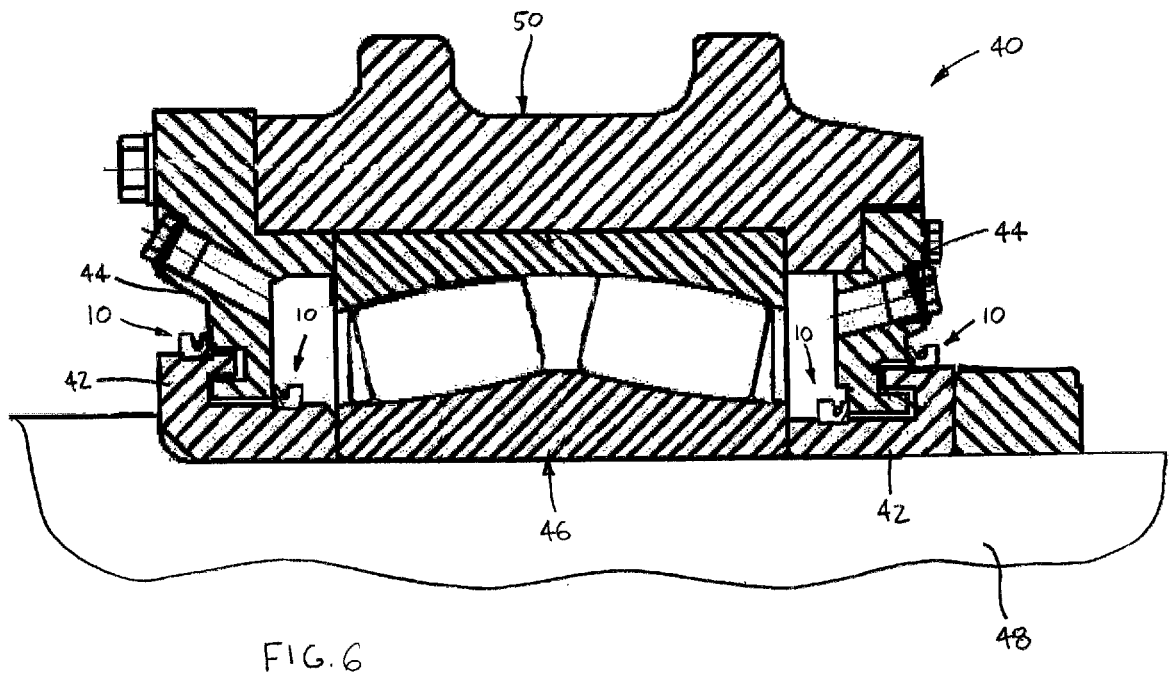
FIG. 6 is a broken-away, axial cross-sectional view of a windmill hub assembly including four seal assemblies of the present invention.
Figure 7:
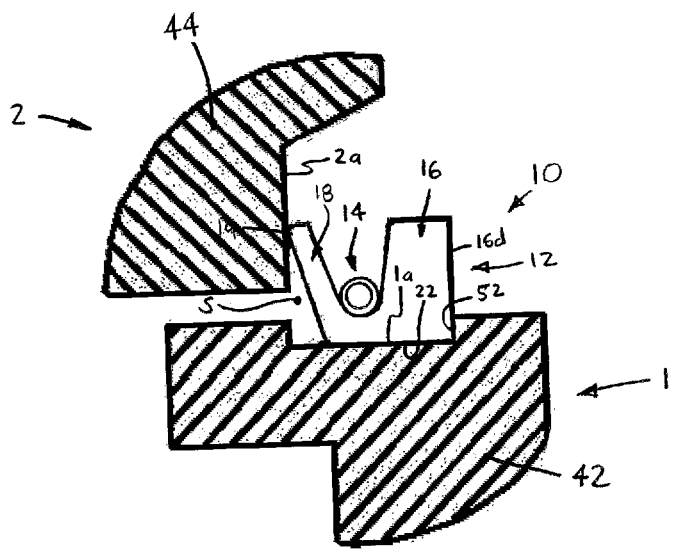
FIG. 7 is an enlarged view of a portion of FIG. 6, showing one of the four seal assemblies.

Referring to FIGS. 1, 2, 6 and 7, the seal assembly 10 may be used in any application, machine, vehicle, etc., in which is it is desired to seal a space S between first and second members 1, 2. For example, in one presently preferred application of the seal assembly 10, four assemblies 10 are used in a windmill bearing assembly 40 in which each first member 1 is a labyrinth seal ring 42 and each second member 2 is a cover 44, as shown in FIGS. 6 and 7. The windmill bearing assembly 44 includes a rolling element bearing 46 mounted on a shaft 48 and disposed within a housing 50, such that the seal assemblies 10 prevent ingress of contaminants into the bearing 46 and egress of lubricant from the bearing 46. However, the depicted example is presented for purposes of illustration only, and the seal assembly 10 may be used in any application where it is desired to seal axially against a generally radially-extending surface.

In any application, the first member 1 preferably has a generally radially-extending shoulder surface 52 adjacent to the circumferential surface 1a and the outer axial end 16d of the seal body base portion 16 is preferably disposed against the shoulder surface 52, as shown in FIGS. 1, 2 and 7. As such, the seal body 12 is essentially "sandwiched" between the shoulder surface 52 and the second member axial surface 2a, which prevents axial displacement of the seal assembly 10. However, the seal assembly 10 may also be used in applications in which the annular body 12 is unsupported, i.e., where there is no shoulder surface 52, and is instead axially retained solely by friction generated by the force F that the biasing member 14 exerts on the body 12.

Having described the structure above, the seal assembly 10 is preferably formed generally as follows, particularly for applications in which the assembly 10 must be installed within an at least partially assembled machine preventing installation of the annular seal body 12. First, an elongated elastomeric body 11 is provided, the body 11 having opposing axial ends 12a, 12b and an elongated V-shaped groove $G_L$ extending between the ends 12a, 12b, as best shown in FIG. 4. Preferably, the circumference of the first member 1 at the outer surface 1a is first determined (i.e., measured or calculated) and then the body 11 is sized (e.g., by cutting, etc.), such that the length $L_B$ of the body 11 is about equal to the circumference of the first member 1 at the outer surface 1a. The biasing member 14 is also provided, preferably as a coil spring 26 as described above.

Figure 9:
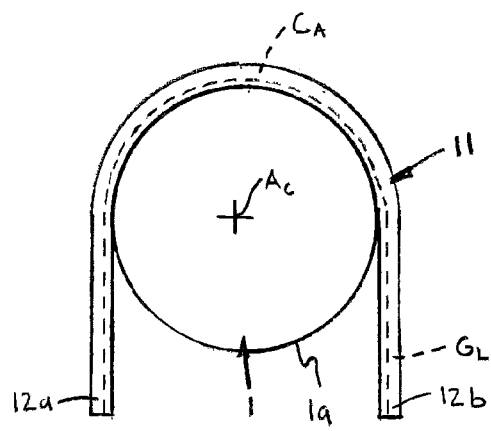
FIG. 9 is another more diagrammatic view of the first member and the flexible elongated seal body, showing the seal body partially bended about the first member.

Next, the elongated body 11 is positioned adjacent to the first member 1 (FIG. 8) such that the body inner sealing surface 22 contacts the first member outer surface 1a and the groove $G_L$ faces generally outwardly away from the first member 1. The body 11 is then bended circumferentially about the first member 1, in other words, bended around the circumferential outer surface 1a to extend complete circuit about the axis $A_C$, as shown in FIGS. 8 and 9, such that the elongated groove $G_L$ forms the annular cavity $C_A$. Then, the ends 12a, 12b of the elongated body 11 are coupled to form the annular seal body 12, preferably by applying an adhesive to at least one of the two elongated body ends 12a, 12b and holding the ends 12a, 12b together until the adhesive sets or hardens to form a solid joint J (FIG. 10). However, the ends 12a, 12 by may be coupled together in other appropriate manner, such as by use of fasteners, melted by applied heat, etc.

At this point, the biasing member 14 is then positioned within the groove or annular cavity $C_A$ such that the biasing member 14 exerts a radially-inwardly directed force F on the annular seal body 12, to thereby prevent relative angular displacement between the seal body 12 and the first member 1. Preferably, the biasing member 14 is installed by bending the coil spring 26 circumferentially and completely about the axis $A_C$ and coupling the ends 26a, 26b of the spring 26 by any appropriate means to form the annular biasing member 14, which is generally similar to a conventional garter spring 24.

Then, the completed seal assembly 10 may be displaced axially relative to the first member 1, if necessary, to position the seal body 12 such that the axial lip 19 at the body sealing portion outer end 18b is sealingly engaged with the second member axial surface 2a.

Although the seal assembly 10 is formed generally as described above, in certain applications, the annular seal body 12 may be pre-formed in any appropriate manner and then installed about the first member 1 by inserting the first member 1 into the bore of the seal body 12. The biasing member 14 may either be installed within the groove $G_L$/cavity $C_A$ prior to installation of the body 12 on the first member, or assembled after in a manner as described above.

The seal assembly 10 is clearly advantageous over prior art V-ring seals. By providing the biasing member 14 to prevent angular displacement of the body 12 relative to the first member 1, the seal body 12 may be sized about equal to, or slightly lesser than, the circumference of the first member 1. As such, little or no extension or stretching of the elongated body 11 is required when forming the annular seal body 12 of the seal assembly 10, therefor eliminating the necessity of using special tooling to stretch and hold the ends 12a, 12b of the body 11. Thus, the seal assembly 10 is simpler to install and eliminates and potential localized deformations of the seal body 12.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A method of forming a seal assembly for sealing a space between first and second members, the first member having a central axis and an outer surface, and the second member having a radially-extending axial surface, the method comprising the steps of:
    providing an elongated elastomeric body and a biasing member, the elongated body having opposing ends and a generally V-shaped groove generally along a length of the body between the opposing ends;
    bending the elongated body circumferentially about the first member outer surface;
    coupling the opposing ends of the elongated body to form an annular seal body; and
    positioning the biasing member within the groove such that the biasing member exerts a radially-inwardly directed force on the annular seal body so as to substantially prevent relative angular displacement between the annular seal body and the first member.

2. The method as recited in claim 1 further comprising the steps of:
    determining the circumference of the first member; and
    sizing the elongated elastomeric body such that the length of the elongated elastomeric body is about equal to the circumference of the first member.

3. The method as recited in claim 1 wherein:
    the elongated elastomeric body includes a base portion and a sealing portion, the groove being defined between the base and sealing portions, the sealing portion having an inner end integrally formed with the base portion and an outer, free end; and
    the method further comprises the step of positioning the annular seal body such that a sealing portion outer end is sealingly engaged with the second member axial surface.

4. The method as recited in claim 3 wherein the step of forming the annular seal body includes forming an annular body having an inner circumferential surface engaged with a shaft outer surface and the step of positioning the biasing member within the groove includes preventing relative displacement between the seal body inner surface and the shaft outer surface.

5. The method as recited in claim 1 wherein the step of bending the elongated body about the shaft includes positioning the elongated member such that the groove faces generally radially outwardly relative to the central axis.

6. The method as recited in claim 1 wherein the step of coupling the opposing ends of the elongated body includes applying an adhesive to at least one of the opposing ends of the elongated body.

7. The method as recited in claim 1 wherein the step of providing a biasing member includes providing a coil spring with opposing ends and the step of positioning the biasing member within the groove includes bending the coil spring circumferentially about the central axis and coupling the ends of the coil spring to form an annular biasing member.

8. The method as recited in claim 1 wherein the step of providing an elongated elastomeric body includes providing an extruded elastomeric body.

9. A method of forming a seal assembly for sealing a space between first and second members, the first member having a central axis and an outer surface, and the second member having a radially-extending axial surface, the method comprising the steps of:
    providing an elongated elastomeric body having opposing ends and a base portion and a sealing portion each extending between the opposing ends, the sealing portion having an inner end integrally formed with the base portion and an outer, free end, a generally annular cavity being defined between the base portion and the sealing portion on one side of the elongated elastomeric body and the elongated elastomeric body having a generally continuous surface extending between the ends on an opposing side of the body;
    providing a biasing member;
    positioning the elongated elastomeric body against a shaft such that a portion of the continuous surface contacts the shaft and a groove faces generally away from the first member outer surface;
    bending the elongated body circumferentially about the first member outer surface;
    coupling the ends of the elongated body to form a generally annular seal body; and
    positioning the biasing member within the groove such that the biasing member exerts a radially-inwardly directed force on the annular seal body so as to substantially prevent relative angular displacement between the annular seal body and the first member.

10. The method as recited in claim 9 further comprising the steps of:
    determining the circumference of the first member; and
    sizing the elongated elastomeric body such that the length of the elongated elastomeric body is about equal to the circumference of the first member.

11. The method as recited in claim 9 further comprising the step of positioning the annular seal body such that the annular seal body sealing portion outer end is sealingly engaged with the second member axial surface.

12. The method as recited in claim 9 wherein the step of coupling the opposing ends of the elongated elastomeric body includes applying an adhesive to at least one of the opposing ends of the elongated elastomeric body.

13. The method as recited in claim 9 wherein the step of providing a biasing member includes providing a coil spring with opposing ends and the step of positioning the biasing member within the groove includes bending the coil spring circumferentially about the central axis and coupling the ends of the coil spring to form an annular biasing member.

14. The method as recited in claim 9 wherein the step of providing an elongated elastomeric body includes providing an extruded elastomeric body.

15. A method of forming a seal assembly for sealing a space between first and second members, the first member having a central axis and an outer surface, and the second member having a radially-extending axial surface, the method comprising the steps of:
    determining the circumference of the first member outer surface;
    providing an elongated elastomeric body and a biasing member, the elongated elastomeric body having opposing ends and a generally V-shaped groove generally along a length of the elongated elastomeric body between the opposing ends;
    sizing the elongated elastomeric body such that the length of the elongated elastomeric body is about equal to the circumference of the first member;
    bending the elongated elastomeric body circumferentially about the first member outer surface;
    coupling the opposing ends of the elongated elastomeric body to form an annular seal body; and
    positioning the biasing member within the groove such that the biasing member exerts a radially-inwardly directed force on the annular seal body so as to substantially prevent relative angular displacement between the annular seal body and the first member.

16. The method as recited in claim 15 wherein:
    the elongated elastomeric body includes a base portion and a sealing portion, the groove being defined between the base and sealing portions, the sealing portion having an inner end integrally formed with the base portion and an outer, free end; and
    the method further comprises the step of positioning the annular seal body such that the elongated elastomeric body sealing portion outer end is sealingly engaged with the second member axial surface.

17. The method as recited in claim 15 wherein the step of bending the elongated elastomeric body about the first member includes positioning the elongated elastomeric body such that the groove faces generally radially outwardly relative to the central axis.

18. The method as recited in claim 15 wherein the step of coupling the opposing ends of the elongated elastomeric body includes applying an adhesive to at least one of the opposing ends of the elongated elastomeric body.

19. The method as recited in claim 15 wherein the step of providing a biasing member includes providing a coil spring with opposing ends and the step of positioning the biasing member within the groove includes bending the coil spring about the central axis and coupling the ends of the coil spring to form an annular biasing member.

* * * * *